Figure 1:
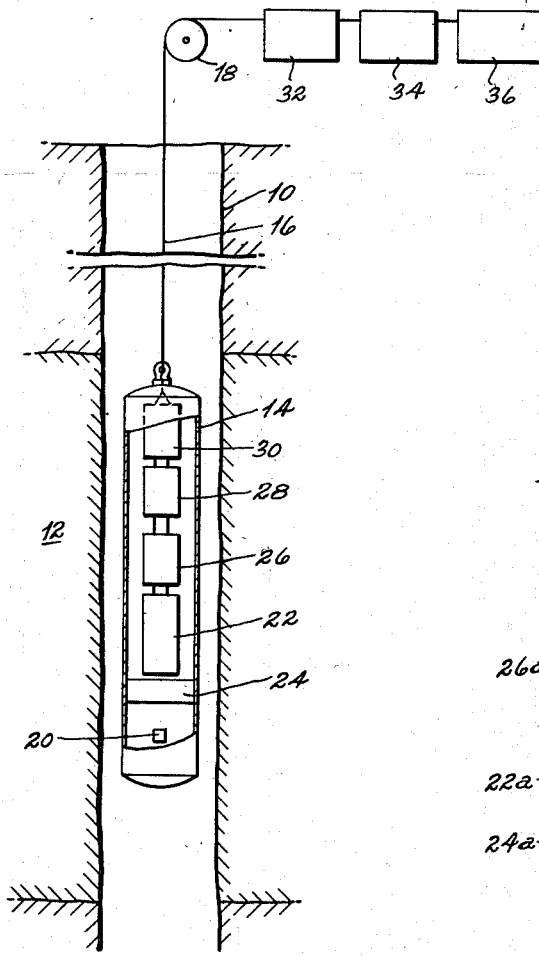

July 7, 1953  G. HERZOG  2,644,891
METHOD OF NEUTRON BOREHOLE LOGGING
Filed March 28, 1950

INVENTOR.
GERHARD HERZOG
BY
ATTORNEYS

Patented July 7, 1953

2,644,891

UNITED STATES PATENT OFFICE 2,644,891

METHOD OF NEUTRON BOREHOLE LOGGING

Gerhard Herzog, Houston, Tex., assignor to The Texas Company, New York, N. Y., a corporation of Delaware Application March 28, 1950, Serial No. 152,489

6 Claims. (Cl. 250—83.6)

This invention relates to the logging of wells or bore holes to determine the nature and characteristics of the formations transversed by the hole, and more particularly to a method in which the formations are bombarded by neutrons and gamma rays from a source in the hole, so that gamma rays induced in the formations by the neutron bombardment can be measured. The principal object of the invention is a provision of such a method which will either eliminate or minimize the effect of the gamma rays from the source which are scattered in the formations and returned to the hole.

As indicated above, in the neutron-gamma ray method of logging a bore hole it is desired to measure the intensity of the induced gamma rays, that is, those gamma rays which are generated or induced in the formations due to nuclear collision with the atoms of the formations and some of which induced gamma rays return to the bore hole. This invention relates particularly to a method of neutron-gamma ray logging in which a neutron source is used which simultaneously emits both neutrons and gamma rays. Such a source, for example, may be a mixture of radium and beryllium. With a source of this kind two types of gamma rays return to the detector in the hole, first, the induced gamma rays, and secondly the disturbing scattered gamma rays. Gamma rays naturally emitted by the formations also intercept the hole but their effect as compared to that of the induced and scattered gamma rays can be held to a negligible amount by using a sufficiently large source in the hole. The induced gamma rays have an energy of about 1 m. e. v. and the scattered gamma rays an energy of approximately ½ m. e. v. Methods have been disclosed for suppressing the lower energy gamma rays by surrounding the detector with an appropriate shield of lead, tungsten, or the like. For example, in my U. S. Letters Patent No. 2,475,137, granted July 5, 1949, a method is described in which a source of neutrons and gamma rays is used with two gamma ray detectors, one of these detectors being unshielded so as to respond to both the high and the low energy gamma rays and the other detector being surrounded with a layer of gamma ray absorbtive material sufficiently thick to absorb the low energy, i. e., the scattered gamma rays and sufficiently thin to permit the passage to the detector of the higher energy or induced gamma rays. Again in my co-pending application Serial No. 583,907, filed March 21, 1945, now U. S. Letters Patent No. 2,512,020, granted June 20, 1950, another method is disclosed which includes the use of a shield around a gamma ray detector for absorbing the undesired scattered gamma rays.

In both of the disclosures mentioned in the foregoing paragraph a gamma ray detector is used which may be of the conventional Geiger-Mueller counter type or which may be a high efficiency multi-cathode plate counter, for the detection of the gamma rays. These devices have in common that the intensity of a discharge and thus the size of the electrical pulse produced is independent of the energy of the gamma ray which has produced it. In other words, with an unshielded gamma ray counter it is impossible to determine whether the discharge has been originated by a high energy induced gamma ray or by a low energy scattered gamma ray.

In accordance with this invention a proportional counter is used as the gamma ray detecting instrument. The current discharge in a proportional counter depends on the number of ions which are produced by the ionizing particle and for gamma rays these particles are created within the counter cathode material by the impinging gamma rays. A high energy gamma ray will produce secondary particles of higher energy and therefore of stronger ionizing power than a lower energy gamma ray. The output of a proportional counter therefore will show pulses up to a maximum size which corresponds to gamma rays which are absorbed and which create secondary electrons in the extreme outer surface of the cathode material. These largest pulses have a certain value which depends on the construction and the gas filling of the counter for the induced high energy gamma rays as well as upon the operating voltage of the counter. The scattered gamma rays produce pulses up to a maximum size which corresponds to their energy and which is, therefore, only approximately ½ that of the pulses due to the induced gamma rays.

In one embodiment of the invention the two types of pulses are separated by passing the output from the proportional counter through a discriminator which passes only those pulses which are larger than the largest pulses which can be ascribed to the scattered gamma rays. The pulses of the output of the discriminator are then further amplified and equalized and passed through the logging cable to the surface and to an integration circuit from which they are finally recorded.

In another embodiment the output of the proportional counter is led to a linear amplifier which does not disturb the relative distribution in size of the pulses. After sufficient amplification the pulses pass through the cable to the surface and then to an integration circuit and from there to a recorder. The recorder in this case will not reflect the number of discharges or pulses in the proportional counter but rather the deflections shown by the recorder will be a measurement of the number of pulses influenced by the size of the individual pulses. In other words, the recorder will show deflections which are proportional to the energy flow produced in the detector by both the induced and the scattered gamma rays. This is somewhat similar to the action of an ionization chamber but has several important advantages not obtained in an ionization chamber. The currents in an ionization chamber are very small and must be amplified very greatly. The proportional counter, on the other hand, because of the nature of this type of detector, is the equivalent of a strong amplifier due to the action of the inherent gas amplification of such a device. Furthermore, due to the need for a very high resistance in the output circuit of an ionization chamber in the bore hole, such a device becomes unstable at elevated temperatures. The proportional counter on the other hand is not affected by high temperatures and can, therefore, be used in logging bore holes where use of an ionization chamber would be impossible.

Figure 2:
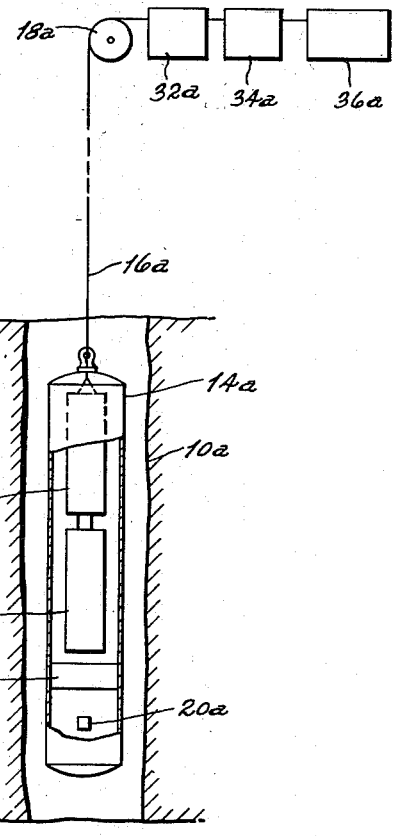

For a better understanding of the invention reference may be had to the accompanying drawing in which Figure 1 is a vertical sectional view through a bore hole in which a well logging instrument is suspended and Figure 2 is a somewhat similar view through a section of a bore hole in which is suspended an instrument embodying a modification of the invention.

Referring to the drawing a bore hole 10 is shown as traversing subsurface formations such as that indicated at 12. Within the bore hole is a logging instrument housing 14 suspended on a cable 16 passing downwardly from the surface over a suitable cable or depth measuring device 18. Within the housing 14 is a source 20 of neutrons and gamma rays such as a mixture of radium and beryllium. Above the source 20 is a proportional counter 22, the counter being separated from the source by a shield 24 for preventing direct radiation from the source passing to the counter. The output of the proportional counter 22 is led to a linear amplifier 26 in which all the pulses from the counter are amplified in substantially the same proportion. The output of the amplifier 26 passes to a suitable discriminator 28 which, as is well known, may be designed to suppress the counter pulses below a predetermined size, i. e., in this case the pulses produced by the scattered or low energy gamma rays. The pulses from the discriminator are conducted to a pulse equalizer 30 which impresses the pulses on the lower end of the cable 16. At the surface the pulses are led from the cable to a suitable pulse amplifier 32 and from there to a suitable integration circuit 34 the output of which passes to the recorder 36.

It is believed that the operation of the device disclosed in Figure 1 will be clear from the previous description. However, in summarizing, neutrons from the source 20 pass into the formation 12 in which gamma rays are induced due to the collision of the neutrons with the atoms of the formation. Some of these induced gamma rays pass back to the bore hole and strike the proportional counter 22. At the same time this is going on gamma rays are emitted from the source 20 and scattered in the formation 12 and in the liquid which is usually in the bore hole, some of these scattered low energy gamma rays striking the proportional counter 22. The pulses of varying sizes produced by the counter 22 are amplified at 26 and in the discriminator 28 the larger pulses only, i. e., those due to the induced gamma rays are passed on to the device 30 where they are equalized and transmitted to the surface over the cable 16. At the surface these pulses are amplified, integrated and recorded.

Figure 2 illustrates a modification. Within the hole 10a is a logging instrument housing 14a suspended by cable 16a passing, as has been described with reference to Figure 1, over a measuring device 18a and to recording equipment which will be described. Within the housing 14a is a source 20a of neutrons and gamma rays, a direct radiation absorbing shield 24a and a proportional counter 22a. These parts are substantially the same as those described with reference to Figure 1. The pulses from the proportional counter 22a pass to the linear amplifier 26a and from there to the surface over the cable 16a. At the surface, as was the case with Figure 1, the cable output is led to a pulse amplifier 32a, to an integration circuit 34a and from there to the recorder 36a. In this case the graph or record produced by the recorder 36a is a measurement of the number of pulses from the proportional counter 22a weighted with the size of the individual pulses, or in other words the recorder deflections are proportional to the energy flow in the proportional counter coming from both the induced and the scattered gamma rays.

It is believed that the operation of a proportional counter, as distinguished from the gamma ray counters mentioned above, is well understood. A proportional counter usually comprises a housing containing a cathode and an anode and an ionizable medium of relatively low density. A potential of approximately 1000 volts is impressed on the cathode and the anode and when a gamma ray strikes the material of the cathode electrical pulses are created due to the ionization of the gas by the secondary electrons, and, as has been explained herein before, the size of the pulses produced depends upon the energy of the radiation intercepting the cathode while the number of the pulses depends upon the intensity of the intercepted rays.

In the co-pending application of K. C. Crumrine, Serial No. 759,368, filed July 7, 1947, now U. S. Letters Patent No. 2,541,341, granted February 13, 1951, a method and apparatus is described which is suitable for the making of neutron-neutron logs, that is logs in which fast neutrons from a source are scattered and slowed down within the surrounding formations, some of the slowed neutrons intercepting a neutron detector within the bore hole near the source. Although it is believed that all of the apparatus which has been described in the present application is well known to those generally familiar with this art, reference may be had, if desired, to this Crumrine application for a more specific illustration of a discriminator, amplifying and integration circuits, etc., which can be used in connection with the present invention.

Obviously many modifications and variations of the invention, as hereinbefore set forth, may be made without departing from the spirit and scope thereof, but only such limitations should be imposed as are indicated in the appended claims.

I claim:

1. The method of logging a bore hole which comprises passing through the hole a source of radiation from which neutrons and gamma rays are emitted, some of the neutrons penetrating the formations surrounding the hole whereby due to nuclear collision with the atoms of the formations gamma rays are induced, some of the induced gamma rays entering the hole, while simultaneously therewith gamma rays from the source are scattered within the formations and returned to the hole, impressing an electrical potential on a single ionizable medium of relatively low density and exposing said medium to said induced gamma rays and to said scattered gamma rays intercepting the hole whereby electrical pulses are created in said ionizable medium, the size of the pulses depending upon the energy of the radiation intercepted, and recording only those pulses created in said medium by the induced gamma rays, and which are larger than the pulses also created in said medium due to scattered gamma rays.

2. The method of logging a bore hole which comprises passing through the hole a source of radiation from which neutrons and gamma rays are emitted, some of the neutrons penetrating the formations surrounding the hole whereby due to nueclear collision with the atoms of the formations gamma rays are induced, some of the induced gamma rays entering the hole, while simultaneously therewith gamma rays from the source are cattered within the formations and returned to the hole, impressing an electrical potential on a single ionizable medium of relatively low density and exposing said medium to said induced gamma rays and to said scattered gamma rays intercepting the hole whereby electrical pulses are created in said ionizable medium, the size of the pulses depending upon the energy of the radiation intercepted, integrating the pulses so created, and recording the integrated pulses.

3. The method of logging a bore hole which comprises passing through the hole a source of radiation from which neutrons and gamma rays are emitted, some of the neutrons penetrating the formations surrounding the hole whereby, due to nuclear collision with the atoms of the formations, gamma rays are induced, some of the induced gamma rays entering the hole, while simultaneously therewith gamma rays from the source are scattered within the formations and returned to the hole, impressing an electrical potential on a single ionizable medium of relatively low density and exposing said medium to said induced gamma rays and to said scattered gamma rays intercepting the hole whereby electrical pulses are created in said ionizable medium, the size of the pulses depending upon the energy of the radiation intercepted, separating the pulses created by those induced gamma rays which are larger than the scattered gamma ray pulses, from those pulses created by the scattered gamma rays, integrating the pulses from the induced gamma rays so separated, and recording the integrated pulses.

4. The method of logging a bore hole which comprises passing through the hole a source of radiation from which neutrons and gamma rays are emitted, some of the neutrons penetrating the formations surrounding the hole whereby due to nuclear collision with the atoms of the formations gamma rays are induced, some of the induced gamma rays entering the hole, while simultaneously therewith gamma rays from the source are scattered within the formations and returned to the hole, impressing an electrical potential of the order of 1000 volts on a single ionizable medium of relatively low density and exposing said medium to said induced gamma rays and to said scattered gamma rays intercepting the hole whereby electrical pulses are created in said ionizable medium, the size of the pulses depending upon the energy of the radiation intercepted, linearly amplifying the pulses so created, separating the amplified pulses created by those induced gamma rays which are larger than the largest scattered gamma ray pulse, from the amplified pulses created by the scattered gamma rays, equalizing the amplified pulses created by the separated induced gamma rays, integrating the equalized pulses and recording the integrated pulses.

5. The method of logging a bore hole which comprises passing through the hole a source of radiation from which neutrons and gamma rays are emitted, some of the neutrons penetrating the formations surrounding the hole whereby due to nuclear collision with the atoms of the formations gamma rays are induced, some of the induced gamma rays entering the hole, while simultaneously therewith gamma rays from the source are scattered within the formation and returned to the hole, impressing an electrical potential on a single ionizable medium of relatively low density and exposing said medium to said induced gamma rays and to said scattered gamma rays intercepting the hole whereby electrical pulses are created in said ionizable medium, the size of the pulses depending upon the energy of the radiation intercepted, amplifying the thus created pulses linearly, transmitting the amplified pulses to the surface, integrating the pulses thus transmitted and recording the integrated pulses as a measurement of the energy flow produced by both the induced and the scattered gamma rays.

6. The method of logging a bore hole which comprises passing through the hole a source of radiation from which neutrons and gamma rays are emitted, some of the neutrons penetrating the formations surrounding the hole whereby due to nuclear collision with the atoms of the formations gamma rays are induced, some of the induced gamma rays entering the hole, while simultaneously therewith gamma rays from the source are scattered within the formations and returned to the hole, impressing an electrical potential of approximately 1000 volts on a single ionizable medium of relatively low density and exposing said medium to said induced gamma rays and to said scattered gamma rays intercepting the hole whereby electrical pulses are created in said ionizable medium, the size of the pulses depending upon the energy of the intercepted radiation integrating the pulses so created and recording the integrated pulses as a measure of the energy flow produced in said medium by both the induced and the scattered gamma rays.

GERHARD HERZOG.

References Cited in the file of this patent

UNITED STATES PATENTS

| Number | Name | Date |
|---|---|---|
| 2,220,509 | Brons | Nov. 5, 1940 |
| 2,419,548 | Grieg | Apr. 29, 1947 |
| 2,434,921 | Grieg | Jan. 27, 1948 |
| 2,434,922 | Grieg | Jan. 27, 1948 |
| 2,469,460 | Fearon | May 10, 1949 |
| 2,481,014 | Herzog | Sept. 6, 1949 |
| 2,504,888 | Siegert et al. | Apr. 18, 1950 |